(12) United States Patent
Yi

(10) Patent No.: US 7,387,674 B1
(45) Date of Patent: Jun. 17, 2008

(54) METHOD FOR SOLIDIFYING SOIL AND INDUSTRIAL WASTE, AND SOLIDIFIED MATERIALS PREPARED THEREBY

(76) Inventor: Kap Sok Yi, 140 W. Fort Lee Rd., A1, Bogota, NJ (US) 07603

( * ) Notice: Subject to any disclaimer, the term of this patent is extended or adjusted under 35 U.S.C. 154(b) by 0 days.

(21) Appl. No.: 11/819,475

(22) Filed: Jun. 27, 2007

(30) Foreign Application Priority Data

Jun. 1, 2007 (KR) .................. 10-2007-0053881

(51) Int. Cl.
*C04B 24/36* (2006.01)
*C04B 14/00* (2006.01)
*C04B 18/00* (2006.01)
*C04B 18/04* (2006.01)
*C04B 18/30* (2006.01)
*C04B 24/04* (2006.01)

(52) U.S. Cl. .................. 106/669; 106/273.1; 106/277; 106/278; 106/281.1; 106/284.03; 106/668; 106/671; 106/697; 106/714; 106/718; 106/719; 106/724; 106/802; 106/803; 106/810; 106/811; 588/3; 588/252

(58) Field of Classification Search ................ 106/668, 106/669, 671, 697, 714, 718, 719, 724, 802, 106/803, 810, 811, 273.1, 277, 278, 281.1, 106/284.03; 588/3, 252
See application file for complete search history.

(56) References Cited

FOREIGN PATENT DOCUMENTS

| KR | 10-0134253 | 1/1995 |
| KR | 10-0639298 | 8/2005 |

OTHER PUBLICATIONS

Derwent-Acc-No. 2007-480627, abstract of Korean Patent Specification No. KR 619939 B1 (Sep. 2006).*

* cited by examiner

*Primary Examiner*—Anthony J Green
(74) *Attorney, Agent, or Firm*—Reed Smith LLP; Stanley P. Fisher, Esq.; Juan Carlos A. Marquez, Esq.

(57) ABSTRACT

Disclosed herein are a method for solidifying soil and industrial waste and a solidified material prepared thereby. The solidified material of soil and industrial waste is prepared by adding 2-6 parts by weight of a 3-5-fold dilution of a solidifying agent and 3-15 parts by weight of cement to 100 parts by weight of soil, industrial waste or a mixture of two or more thereof. The solidified material prepared according to this method has excellent density, strength, elasticity and durability, and thus can be used as a substitute for stone material. Also, it can be advantageously used in high-temperature and high-humidity areas, because external impact or pressure is relieved because it is absorbed by asphalt.

5 Claims, No Drawings

METHOD FOR SOLIDIFYING SOIL AND INDUSTRIAL WASTE, AND SOLIDIFIED MATERIALS PREPARED THEREBY

BACKGROUND OF THE INVENTION

1. Field of the Invention

The present invention relates to a method for solidifying soil and industrial waste and a solidified material obtained thereby. More particularly, the present invention relates to a method for solidifying soil and industrial waste, in which a solidified material of soil and industrial waste, having physical properties that enable it to be used as a substitute for stone material, can be prepared by adding a solidifying agent, containing straight asphalt as a main component, and a small amount of cement, to a single kind of soil or a mixture of soil, such as decomposed granite soil, mud, river sand and sea sand, and a single kind of industrial waste or a mixture of industrial waste, such as slag, powder slag, waste concrete and sludge, as well as a solidified material prepared by said method.

2. Description of the Prior Art

These days, due to the difficulty in securing good-quality construction materials in the public works and construction industries, the construction period is lengthened, thus increasing expenses. Also, to secure construction materials, stony mountains are exploited or aggregate is extracted from rivers, sea floors and the like, thus destroying the natural environment and disturbing ecosystems. Specifically, because granular materials such as stone materials are used in harbor reclamation and asphalt and concrete paving, fields and mountains are destroyed to quarry stones, and stone cutting, transport and breaking work act as factors increasing construction expenses. In addition, because general soil is used in most riverbank construction, dikes break due to the reduced durability and safety caused by scouring resulting from water stream pressure, thus causing flood damage and the spread of disease. Also, in the case of soft ground improvement according to the prior art, a high construction cost is incurred, and the loss of material used is high.

To solve these problems, there have been attempts to recycle soil and industrial waste, widely distributed throughout Korea, as a substitute for stone materials in various public works and other construction industries.

In such attempts, cement stabilization methods, LAC (lignin rosin asphalt concrete) methods and the like have been developed and used. However, the materials corresponding to these methods show a long curing time, making it difficult to obtain early compressive strength, and also have a low compressive strength of 100 kgf/cm². For this reason, the application of these materials has been limited to sub-base layer materials in road construction and the like.

In another attempt, Korean Patent Laid-Open Publication No. 1996-29280 discloses a method of curing a mixture of industrial waste and soil using a curing agent composition. In this method, the curing agent composition comprises 25% sodium carbonate, 25% potassium chloride, 15% magnesium carbonate, 10% ammonium chloride, 8% potassium silicate, 7% silicate, 5% ferrous sulfate and 5% titanium oxide. The curing agent is described as being suitable for solidifying a mixture of industrial waste and soil, but it contains sodium carbonate and potassium chloride as main components, and thus is expensive. Also, the strength of the solidified materials prepared using the curing agent is not greatly increased, and thus there is a need to develop a solidifying agent which can further increase the strength of the solidified materials.

As described above, stone materials can be used in a wide range of applications, including harbors, foreshores, roads, airports, water resources development, soil and public works, but the resources thereof are restricted. For this reason, there has been an urgent demand for a method of enabling the recycling of industrial waste, which are generated in construction fields in large amounts and are readily available, and soil such as decomposed granite soil.

According to this demand, the present inventors filed a patent application relating to a solidifying composition containing 25-35 wt % of emulsified asphalt, 0.05-0.20 wt % of an emulsifier for asphalt, 0.1-0.3 wt % of hydrochloric acid, 0.01-0.05 wt % of calcium chloride, 0.1-0.5 wt % of lignin, 0.01-0.05 wt % of oleic acid, 0.005-0.030 wt % of a surfactant, and the balance of water (Korean Patent Application No. 2005-0070706, filed on Aug. 2, 2005). However, this composition has problems in that it contains emulsified asphalt, which increases the production cost of the composition, and it shows insufficient impact resistance and low flexibility.

SUMMARY OF THE INVENTION

Accordingly, the present inventors have conducted many studies to solve the above-described problems occurring in the prior art and, as a result, have found that, when a solidifying agent, which consists of a specific composition and has a property of being cured rapidly, is added to soil, industrial waste and a small amount of cement, it is possible to provide a solidified material comprising soil and industrial waste, which has increased density, strength and elasticity, excellent durability and a short curing time, enabling it to be used as construction material or material for public works instead of stone material, and at the same time, can contribute to the preservation of the natural environment because it can be prepared using soil generated in construction fields, thereby completing the present invention.

It is an object of the present invention to provide a method for solidifying soil and industrial waste, which enables a high-strength solidified material to be prepared using soil, industrial waste or a mixture thereof as a raw material.

Another object of the present invention is to provide a solidified material of soil and industrial waste, which is prepared by said solidifying method and can be used in various construction and civil engineering fields.

To achieve the above objects, according to one aspect of the present invention, there is provided a method for solidifying soil and industrial waste, the method comprising adding 2-6 parts by weight of a 3-5-fold dilution of a solidifying agent and 3-15 parts by weight of cement to 100 parts by weight of soil, industrial waste or a mixture of two or more thereof, wherein the solidifying agent contains, based on the total weight of the solidifying agent, 16-24 wt % of straight asphalt, 0.06-0.10 wt % of an emulsifier for asphalt, 0.8-1.2 wt % of light oil, heavy oil or a mixture thereof, 0.01-0.03 wt % of calcium chloride, 0.8-1.2 wt % of lignin, 0.7-1.3 wt % of an acrylic emulsion-based asphalt modifier, 0.13-0.21 wt % of sodium hydroxide, 0.22-0.34 wt % of oleic acid, and the balance of water, and the 3-5-fold dilution contains, in addition to 100 parts by weight of the solidifying agent, 200-400 parts by weight of water.

According to another aspect, there is provided a solidified material of soil and industrial waste, which is prepared by adding 2-6 parts by weight of a 3-5-fold dilution of a solidifying agent and 3-15 parts by weight of cement to 100 parts by weight of soil, industrial waste or a mixture of two or more thereof, wherein the solidifying agent contains, based on the total weight of the solidifying agent, 16-24 wt % of straight asphalt, 0.06-0.10 wt % of an emulsifier for asphalt, 0.8-1.2 wt % of light oil, heavy oil or a mixture thereof, 0.01-0.03 wt % of calcium chloride, 0.8-1.2 wt % of lignin, 0.7-1.3 wt % of an acrylic emulsion-based asphalt modifier, 0.13-0.21 wt % of sodium hydroxide, 0.22-0.34 wt % of oleic acid, and the balance of water.

DETAILED DESCRIPTION OF THE INVENTION

Hereinafter, the present invention will be described in further detail.

A solidified material of soil and industrial waste according to the present invention is prepared by adding a solidifying agent, serving as a binder, which facilitates the solidification of soil and industrial waste, and a small amount of cement, to soil, industrial waste or a mixture of two or more thereof.

In the present invention, as the soil, any soil can be used without any particular limitation as long as it is generally classified as one of general soil, including decomposed granite soil, mud, river sand, sea sand, and natural soil, and it is preferable to use either decomposed granite soil alone or a mixture of decomposed granite soil and other soil. Herein, the term "industrial waste" is generally used to mean an unnecessary surplus generated in a building or area occupied by an industrial firm, and material classified as waste is generally limited to solid waste, including waste oil. In the present invention, any waste can be used as long as it is classified as one kind of waste in the broad sense, including sludge, residue, ash, and environmental waste. Preferably, slag generated in furnaces, powder slag, waste concrete, and sludge, remaining after the dressing of various ores, are used alone or in a mixture of two or more thereof. In the present invention, soil or industrial waste can be used alone or in a mixture, and a mixture of soil and industrial waste may also be used.

Meanwhile, the solidifying agent comprises straight asphalt, an emulsifier for asphalt, light oil, heavy oil or a mixture thereof, calcium chloride, lignin, an acrylic emulsion-based asphalt modifier, sodium hydroxide, oleic acid, and water. The solidifying agent serves to impart effective strength to soil and industrial waste and to prevent cracks caused by drying and shrinkage.

Generally, petroleum asphalt is obtained in processes for producing petroleum-based products, such as petroleum refining, and can be divided into straight asphalt, asphalt cement, cutback asphalt, emulsified asphalt, blown asphalt, modified asphalt and the like. Among them, the straight asphalt is the heaviest fraction contained in crude oil, and is residue obtained by completely removing light fractions by distillation in a high vacuum through a vacuum distillation system. It has high elongation and adhesion, and the softening point thereof is generally lower than 65° C. It is used mainly for road pavement and airport pavement. Such straight asphalt is commercially available under the trade names of AP-3, AP-5, etc. from asphalt production companies in Korea, and thus it can be used without any additional processing to thus reduce production cost. In the present invention, the straight asphalt serves to increase the elasticity and stability of mixed particles, including soil or industrial waste, cement and a solidifying agent, and waterproof surfaces. If it is contained in an amount of less than 16 wt %, the stability and adhesion of the solidifying agent will be insufficient due to a reduction in the elasticity between particles, and if it is contained in an amount of more than 24 wt %, it will increase product costs and reduce strength. For this reason, it is contained in an amount of 16-24 wt % based on the total weight of the solidifying agent.

The emulsifier for asphalt has good degradability due to its high emulsifying ability, and is thus used to emulsify asphalt. As the emulsifier, any emulsifier can be used without any particular limitation as long as it is a cationic or non-ionic emulsifier. If it is contained in an amount of less than 0.06 wt %, it will not emulsify asphalt, and if it is contained in an amount of more than 0.10 wt %, it will increase product costs and its emulsifying function can decrease rather than increase. For this reason, the emulsifier is contained in an amount of 0.06-0.10 wt % based on the total weight of the solidifying agent.

Light oil, heavy oil or a mixture thereof is used to solve the phenomenon in which, when straight asphalt is used as it is, it will have low penetration, will be readily solidified at room temperature, and will thus be very difficult to emulsify. If it is contained in an amount of less than 0.8 wt %, the emulsification of straight asphalt will not be easy, and if it is contained in an amount of 1.2 wt %, straight asphalt will not be easily solidified after emulsification. For this reason, it is contained in an amount of 0.8-1.2 wt % based on the amount of the solidifying agent.

Calcium chloride serves as a catalyzing agent to promote moisture absorption along with water absorption and prevent freezing. If it is contained in an amount of less than 0.01 wt %, it will not sufficiently absorb moisture, and thus will has an insufficient effect on the prevention of freezing, and if is contained in an amount of 0.03 wt %, a large amount of anhydrides will be generated, making it difficult to maintain the solidifying agent in the liquid state. For this reason, it is contained in an amount of 0.01-0.03 wt % based on the total weight of the solidifying agent.

Lignin serves to disperse raw materials, such as soil, industrial waste and cement, and to bind cement to raw materials to increase the strength of the raw materials. If it is contained in an amount of less than 0.8 wt %, the dispersion of particles will be insufficient and the strength of the resulting material will be reduced, and if it is contained in an amount of more than 1.2 wt %, it will interfere with the chemical reaction of other materials because it has a three-dimensional network structure. For this reason, it is contained in an amount of 0.8-1.2 wt % based on the total weight of the solidifying agent.

The acrylic emulsion-based asphalt modifier serves to disperse and distribute fine particles and is used to adhere particles to each other because it has excellent adhesion. It also has an excellent waterproofing effect. If it is contained in an amount of less than 0.7 wt %, it will not emulsify asphalt or the like, and if it is contained in an amount of more than 1.3 wt %, it will increase the adhesion between particles, but will increase product costs. For this reason, it is contained in an amount of 0.7-1.3 wt % based on the total weight of the solidifying agent. Preferably, the modifier is a styrene-butadiene-styrene (SBS) block copolymer. For example, Butonal NS 198 (manufactured by BASF, USA) can be used.

Sodium hydroxide serves to decompose organic materials and absorb moisture and carbon dioxide in the air to form sodium carbonate, which controls the concentration of the emulsion. It also acts to adjust the pH of the emulsion. If it is contained in an amount of less than 0.13 wt %, it will reduce the concentration and viscosity of the emulsion and make the emulsion strongly acidic or basic, and if it is contained in an amount of more than 0.21 wt %, it will reduce the concentration and viscosity of the emulsion, make emulsion strongly acidic or basic, and cause environmental problems. For this reason, it is contained in an amount of 0.13-0.21 wt % based on the total weight of the solidifying agent.

Oleic acid, a kind of fatty acid surfactant, is used as an emulsifying agent and serves to facilitate the absorption of other materials into mixed particles. Also, it acts to penetrate the inner surface of mixed particles to increase the waterproof property of the inner surface and reduce solidification in freezing weather. If it is contained in an amount of less than 0.22 wt %, the waterproofing property of the solidifying agent will be reduced, and if it is contained in an amount of more than 0.34 wt %, it will form a suspension. For this reason, it is contained in an amount of 0.22-0.34 wt % based on the total weight of the solidifying agent.

Water is included to make up the rest of the above-described components, and the content thereof is adjusted according to the kind and wettability of product. If water is contained in an excessively small amount, emulsification and dispersion will not sufficiently occur, and the cost of the solidifying agent will increase, and if it is contained in an excess amount, it will reduce the adhesion between particles, waterproofing ability and strength of the composition. For this reason, the content of water should also be adjusted in a suitable range. Most preferably, it is contained in an amount of about 70-80 wt % based on the total weight of the solidifying agent.

The prior solidifying agent, containing emulsified asphalt, showed insufficient impact resistance and low flexibility. However, in the solidifying agent of the present invention, straight asphalt, having penetration lower than that of emulsified asphalt, is used, and light oil, heavy oil or a mixture thereof is used to emulsify the straight asphalt to increase the penetration of the straight asphalt. Moreover, in the solidifying agent of the present invention, sodium hydroxide is used instead of the prior surfactant to improve the decomposition of organic materials so as to maintain the composition in a stable emulsion state. Furthermore, the acrylic emulsion-based asphalt modifier is used to improve abrasion resistance, impact resistance, flexibility, low stress, release, heat resistance and weather resistance.

The solidifying agent of the present invention can be prepared by mixing the above components with each other. Alternatively, it can also be prepared in the form of a dilution by further adding water to the solidifying agent to a given concentration. Particularly, the solidifying agent of the present invention can be prepared as a 3-5-fold dilution by adding 200-400 parts by weight of water to 100 parts by weight of the solidifying agent. In this case, the dilution can be added directly to soil, industrial waste and cement without carrying out a separate process of adding water to the solidifying agent in the preparation of solidified material.

The solidifying agent prepared according to this composition, and the dilution thereof, are present in a liquid state, and thus are mixed uniformly with soil and industrial waste, so that variation in the strength of the resulting product is very low, making process and quality control easier. However, if the 3-5-fold dilution of the solidifying agent is used in an amount of less than 2 parts by weight based on 100 parts by weight of soil, industrial waste or a mixture of two or more thereof, there can be a problem in solidification and strength, and if it is used in an amount of 6 parts by weight or higher, it will increase the economic burden and harm the environment. For this reason, it is preferably used in an amount of 2-6 parts by weight, and more preferably 3-4 parts by weight.

Meanwhile, if cement is used in an excessive amount, it will be uneconomical and cause environmental problems. Thus, the amount of cement that is used can be determined through field tests within limits provided in respective countries. In the present invention, cement can be used in an amount of 3-15 parts by weight based on 100 parts by weight of soil, industrial waste or a mixture of two or more thereof. Although it is effective to use cement in an increased amount, the use of cement even in an amount of only 3 parts by weight can show the effects of the present invention.

When soil, industrial waste or a mixture thereof, a dilution of the solidifying agent, and cement, are prepared according to the above composition, solidified material can be prepared by mixing these components with each other according to a conventional method. When the solidified material of soil and industrial waste is prepared according to this solidifying method, it has increased density, strength and elasticity, excellent structural durability at high temperature, and a short curing time, and thus can be used as a substitute for stone material in public or construction works. When an automatic mixing plant is used in the mixing process, uniform mixing is ensured and water content is more easily controlled, making it possible to prepare a solidified material of soil and industrial waste having higher quality.

The solidified material prepared according to this solidifying method can be used as a material in public and construction works. Particularly, it is preferably used as a granular material in harbor reclamation and quay construction, a road base layer material and sub-layer material, a material for constructing the core wall of soil dams, and a material for the improvement of soft ground.

TEST EXAMPLE 1

In order to evaluate the strengths of soil or industrial waste specimens prepared by adding the solidifying composition to soil or industrial waste, the basic physical properties of decomposed granite soil, slag, powder slag, sludge and waste concrete, which were used in the following preparation examples, were tested and measured according to the testing methods shown in Table 1 below. The measurement results are shown in Table 2 below. For each of the tests, a representative sample was sampled by quartering from each of materials carried in our laboratory.

TABLE 1

| Basic physical properties | Test methods |
| --- | --- |
| Moisture content | KS F 2306 |
| Specific gravity | KS F 2308 |
| Liquid limit | KS F 2303 |
| Plastic limit | KS F 2304 |
| Particle size | KS F 2302 |
| Sieve analysis | KS F 2309 |

TABLE 2

| Samples | Water content (Wn)(%) | Specific gravity (Gs) (ton/m³) | Liquid limit (LL)(%) | Plastic limit (PP)(%) | Pass through #200 sieve (%) | Particle size (USCS) |
|---|---|---|---|---|---|---|
| Decomposed granite soil | 19.6 | 2.65 | 29.1 | 13.6 | 12.9 | coarse-grained soil |
| Slag | 15.8 | 3.05 | — | — | 0.60 | — |
| Powder slag | 14.3 | 3.05 | — | — | 7.52 | — |
| Sludge | 16.4 | 3.01 | — | — | 62.8 | — |
| Waste concrete | 13.4 | 2.98 | — | — | 2.07 | — |

Hereinafter, the preparation of a solidifying agent will first be described, and the present invention will then be described in further detail with reference to examples and comparative examples. It is to be understood, however, that these examples are illustrative only, and the scope of the present invention is not limited thereto.

PREPARATION EXAMPLES 1 TO 3

Solidifying Agents

Straight asphalt (AP-3; manufactured by SK Corporation, Korea) or emulsified asphalt (AP-3; manufactured by SK Corporation, Korea) was stored in a separate storage tank at a temperature higher than 130° C. In another storage tank, a mixture containing quantified amounts of an emulsifier for asphalt (Farmin ST-7; Kao Corp., Japan), light oil, calcium chloride, lignin, an acrylic emulsion-based asphalt modifier (Butonal NS198, BASF, USA), sodium hydroxide, oleic acid and water was stored at a temperature of 80° C. The asphalt and the mixture were placed and emulsified in a homogenizer, thus preparing solidifying agents. Herein, each of the components was added in the amount shown in Table 3 below.

TABLE 3

| | Preparation Examples | | |
|---|---|---|---|
| Components (wt %) | 1 | 2 | 3 |
| Straight asphalt | 20.0 | 16.0 | 24.0 |
| Emulsifier for asphalt | 0.08 | 0.06 | 0.10 |
| Light oil | 1.0 | 0.8 | 1.2 |
| Calcium chloride | 0.02 | 0.01 | 0.03 |
| Lignin | 1.0 | 0.8 | 1.2 |
| Acrylic emulsion-based asphalt modifier | 1.0 | 0.8 | 1.2 |
| Sodium hydroxide | 0.17 | 0.13 | 0.21 |
| Oleic acid | 0.28 | 0.22 | 0.34 |
| Water | Balance | Balance | Balance |

EXAMPLES 1 TO 11 AND COMPARATIVE PREPARATION EXAMPLES 1 TO 4

Preparation of Specimens 4-fold dilutions were prepared in advance by adding 300 parts by weight of water to 100 parts by weight of the solidifying agents of Examples 1-3, prepared according to the components and contents shown in Table 3. According to compositions shown in Tables 4 to 6, Portland cement was mixed with each of the prepared solidifying composition dilutions. Then, each of the samples (soil or industrial waste) was placed in a cylindrical mold having two joints on both sides to form three layers, and was rammed 25 times for each layer, thus forming a specimen having a 50 mm diameter and a 100 mm height. Herein, water leakage and deformation did not occur at the joints and the upper and lower ends, and mineral oil was applied to the inner surface of the mold such that the specimen could be easily separated from the mold after curing. After completion of this process, the specimen was cured for 7 days by water immersion. After completion of curing for 7 days, the specimen was separated from the mold, and the upper and lower ends thereof were ground to a flatness of less than 0.05 mm. The soil and industrial waste used herein were the representative samples used in Test Examples 1.

TABLE 4

| Components (parts by weight) | | Examples | | | | Comparative Examples | | |
|---|---|---|---|---|---|---|---|---|
| | | 1 | 2 | 3 | 4 | 1 | 2 | 3 |
| Dilution of solidifying agent | Preparation Example 1 | 4 | — | — | 6 | 1 | — | — |
| | Preparation Example 2 | — | 4 | — | — | — | 1 | — |
| | Preparation Example 3 | — | — | 4 | — | — | — | 1 |
| Cement | Portland cement | 10 | 10 | 10 | 10 | 10 | 10 | 10 |
| Soil or industrial waste | Decomposed granite soil | 100 | 100 | 100 | 100 | 100 | 100 | 100 |

TABLE 5

| Components (parts by weight) | | Example | | | | Comparative Examples |
|---|---|---|---|---|---|---|
| | | 5 | 6 | 7 | 8 | 4 |
| Dilution of solidifying agent | Preparation Example 1 | 4 | — | 6 | | 1 |
| | Preparation Example 2 | — | 4 | — | — | |
| | Preparation Example 3 | — | — | 4 | — | |
| Cement | Portland cement | 10 | 10 | 10 | 10 | 10 |
| Soil or industrial waste | Slag | | | | | |

TABLE 6

| Components (parts by weight) | | Examples | | |
| --- | --- | --- | --- | --- |
| | | 9 | 10 | 11 |
| Dilution of solidifying agent | Preparation Example 1 | 4 | 4 | 4 |
| Cement | Portland cement | 10 | 10 | 10 |
| Soil or industrial waste | Powder slag | 100 | — | — |
| | Waste concrete | — | 100 | — |
| | Sludge | — | — | 100 |

TEST EXAMPLE 2

Each of the specimens prepared in Preparation Examples 1-7 and Comparative Preparation Examples 1-4 was cured for 7 days and 28 days. Then, according to KS F 2405, the upper and lower surfaces of a pressurizing plate of a tester were cleaned, and the prepared specimen was placed on the pressurizing plate such that it coincided with the central axis of the pressurizing plate. Then, a load was placed on the specimen at a given speed such that an impact was not applied to the specimen. The application speed of the load was such that the increase in compression stress was 2-3 kgf/cm$^2$ per second. After the specimen started to deform rapidly, controlling the application speed of the load was stopped and the load was continuously applied to measure the uniaxial compressive strength of the specimen. The measurement results are shown in Table 7 below.

TABLE 7

| | Uniaxial compressive strength (kgf/cm$^2$) | |
| --- | --- | --- |
| | Curing for 7 days | Curing for 28 days |
| Example 1 | 158.41 | 250.28 |
| Example 2 | 158.03 | 260.74 |
| Example 3 | 162.22 | 259.55 |
| Example 4 | 161.89 | 262.26 |
| Example 5 | 108.93 | 175.37 |
| Example 6 | 111.25 | 175.77 |
| Example 7 | 107.89 | 171.54 |
| Example 8 | 129.97 | 207.95 |
| Example 9 | 100.85 | 168.41 |
| Example 10 | 90.18 | 142.48 |
| Example 11 | 68.34 | 118.22 |
| Comparative Example 1 | 92.29 | 152.27 |
| Comparative Example 2 | 100.34 | 159.54 |
| Comparative Example 3 | 98.05 | 164.72 |
| Comparative Example 4 | 87.85 | 144.07 |

As can be seen in Table 7 above, Examples 1-11 showed a compressive strength of about 110-270 kgf/cm$^2$ when they were cured for 28 days after mixing. The decomposed granite soil treated with the solidifying composition of the present invention (Preparation Examples 1-4) showed the highest compressive strength. When the same amount of cement was used, compressive strength was sequentially decreased in the order of decomposed granite soil (Example 1), slag (Example 5), powder slag (Example 9), waste concrete (10) and sludge (Example 11). From the compressive strengths of decomposed granite soil specimens (Example 1 and Comparative Example 1) and slag specimens (Example 5 and Comparative Example 4), which were prepared using the same amount of cement and different amounts of the solidifying agent, it was found that the amount of solidifying agent added played an important role in the increase in compressive strength.

The solidifying agent of the present invention can be used to prepare solidified materials having various strengths by adjusting the curing time and the amounts of cement and the solidifying composition. Thus, solidified materials formed using the inventive solidifying agent can be applied in various fields.

In Examples of the present invention, the specimens were prepared using soil or industrial waste alone, but the preparation method of the present invention is not limited only to these examples, and can also be applied to a mixture of soil, a mixture of industrial waste or a mixture of soil and industrial waste together.

The solidified material of the present invention can be produced by weighing and transferring each of soil, industrial waste or a mixture thereof, cement and a dilution of the solidifying agent using conventional means and then mixing these components with each other. When an automatic mixing plant (for example, Portable Stability Soil Base Mixing Plant; HuEn E&C Co., Ltd., Korea) is used in the mixing process, because the materials are weighed and mixed using the automated equipment, uniform mixing is ensured and water content is more easily controlled, making it possible to prepare a solidified material of soil and industrial waste having higher quality.

Thus, working efficiency is increased and construction becomes convenient, thus shortening a construction period. The capacity of the equipment is determined depending on the scale, character, topographical location and budget of construction work, and in general public works, equipment having a production capacity of 3.0-5.0 m$^3$/min is used.

Hereinafter, fields to which the solidified material prepared by the inventive solidifying method can be applied after curing will be described in detail.

(1) Harbor and Foreshore Field

Granular materials such as stone materials have been used as harbor reclamation material and quay construction material, and thus, fields and mountains have been destroyed to quarry stones, and stone cutting, transport and breaking works have acted as factors that increase construction expenses and destroy the environment. When the solidified material of the present invention, which is prepared using soil and industrial waste, including soil, waste slag, construction waste material and ashes, is used instead of stone material, it can reduce construction costs and contribute to the preservation of the natural environment. For example, a solidified material prepared by adding 15 parts by weight of cement and 5 parts by weight of a solidifying agent dilution to 100 parts by weight of soil, industrial waste or a mixture of two or more thereof can be used as a harbor reclamation material. In the harbor and foreshore field, the solidified material prepared according to the inventive method has advantages in that it shows excellent strength in an early stage, has increased water barrier and strength properties, and thus swells and deforms less upon the penetration of sea water. Also, it strongly resists weather conditions such as freezing, shows reduced generation of cracks attributable to shrinkage, is environmentally stable, and is easy to handle.

(2) Road and Airport Field

In the prior asphalt and concrete paving, granular materials such as crushed stones have been used, and such crushed stones have the same problems as those of stone materials. When the solidified material of the present invention, which is prepared using soil and industrial waste, including soil, waste slag, construction waste material and ashes, is used instead of stone material in road base layers and sub-base layers, and base layers in runaways and aircraft transfer roads, it can reduce construction cost and contribute to natural environmental preservation. For example, a solidified material prepared by adding 5 parts by weight of cement and 3 parts by weight of a solidifying agent dilution can be used as a base layer material, and a solidified material prepared by adding 3 parts by weight of cement and 3 parts by weight of a solidifying agent dilution can be used as a sub-base layer material. In the road and airport field, the solidified material prepared according to the inventive method has advantages in that it shows excellent strength in an early stage and has increased water barrier and strength properties, and thus swells and deforms less upon the penetration of water. Also, it strongly resists weather conditions such as freezing, shows reduced generation of cracks attributable to shrinkage, is environmentally stable and is easy to handle. Moreover, the solidified material shows a significant reduction in the dissolution of heavy metals compared to existing asphalt concrete pavement or cement pavement. It was tested by immersing it in sea water, and as a result, it was found to be so environmentally friendly that shellfish attached themselves thereto and lived on it. In the harbor and foreshore field, it is considered that the solidifying agent, soil and cement start to chemically react with each other, and after about 3 hours, the amount of toxic substances harmful to the human body is remarkably reduced.

(3) Water Resources Development Field

Because general soil is used in most riverbank construction, dikes break due to reduced durability and safety caused by scouring, resulting from water stream pressure, thus causing flood damage and the spread of disease. When the solidified material of the present invention, which is prepared using soil and industrial waste, including soil, waste slag, construction waste material and ashes, is used in the construction and repair of river banks and the construction of soil dams, it can reduce construction cost and contribute to natural environmental preservation. In the water resources development field, the solidified material prepared according to the inventive method has advantages in that it shows excellent strength in an early stage, has increased water barrier and strength properties, and thus swells and deforms less upon the penetration of water. Also, it strongly resists weather conditions such as freezing, shows reduced generation of cracks attributable to shrinkage, is environmentally stable, and is easy to handle. Particularly, the solidified material prepared according to the present invention can substitute for watertight mud, which has been used as the material of a core wall in the construction of soil dams, and thus it can prevent the environment from being damaged due to the extraction of mud.

(4) Soil and Foundation Field

When the solidified material of the present invention, which is prepared using soil and industrial waste, including soil, waste slag, construction waste materials and ashes, is used as a material for soft ground improvement, it can reduce construction costs and contribute to natural environmental preservation. In the soil and foundation field, the solidified material prepared according to the inventive method has advantages in that it shows excellent strength in an early stage, has increased water barrier and strength properties and swells and deforms less upon the penetration of water. Also, it strongly resists weather conditions such as freezing, shows reduced generation of cracks attributable to shrinkage, is environmentally stable, is easy to handle, and can show necessary initial strength even in consideration only of the solidification of the surface layer thereof.

The solidified material according to the present invention can be used in civil engineering and construction fields, including the above-described fields, without limitation.

As is apparent from the foregoing, according to the solidifying method of the present invention, it is possible to prepare a solidified material of soil and industrial waste, which has increased density, strength and elasticity, excellent durability and a short curing time. Thus, the solidified material can be used as a construction material or civil engineering material instead of stone material, and at the same time, is economical and can contribute to natural environmental preservation, because it can be prepared using soil generated in construction fields. Also, the solidified material can be advantageously used in high-temperature and high-humidity areas, because external impact or pressure is relieved by absorption into asphalt.

Although the preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for solidifying soil and/or industrial waste, the method comprising adding 2-6 parts by weight of a 3-5-fold dilution of a solidifying agent and 3-15 parts by weight of cement to 100 parts by weight of soil, industrial waste or a mixture of two or more thereof, wherein the solidifying agent contains, based on the total weight of the solidifying agent, 16-24 wt % of straight asphalt, 0.06-0.10 wt % of an emulsifier for asphalt, 0.8-1.2 wt % of oil, 0.01-0.03 wt % of calcium chloride, 0.8-1.2 wt % of lignin, 0.7-1.3 wt % of an acrylic emulsion-based asphalt modifier, 0.13-0.21 wt % of sodium hydroxide, 0.22-0.34 wt % of oleic acid, and a balance of water, and the 3-5-fold dilution contains, in addition to 100 parts by weight of the solidifying agent, 200-400 parts by weight of water.

2. The method of claim 1, wherein the dilution of the solidifying agent is contained in an amount of 3-4 parts by weight.

3. The method of claim 1, wherein the soil is a single decomposed granite soil or a mixture containing decomposed granite soil, and the industrial waste is at least one selected from the group consisting of slag, powder slag, waste concrete, and mixtures of two or more thereof.

4. A solidified material of soil and/or industrial waste, which is prepared by adding 2-6 parts by weight of a 3-5-fold dilution of a solidifying agent and 3-15 parts by weight of cement to 100 parts by weight of soil, industrial waste or a mixture of two or more thereof, wherein the solidifying agent contains, based on the total weight of the solidifying agent, 16-24 wt % of straight asphalt, 0.06-0.10 wt % of an emulsifier for asphalt, 0.8-1.2 wt % of oil, 0.01-0.03 wt % of calcium chloride, 0.8-1.2 wt % of lignin, 0.7-1.3 wt % of an acrylic emulsion-based asphalt modifier, 0.13-0.21 wt % of sodium hydroxide, 0.22-0.34 wt % of oleic acid, and a balance of water.

5. A solidified material of soil and/or industrial waste for use as a harbor reclamation material, a quay construction material, a road base layer material, a road sub-base layer material, a material for constructing the core wall of riverbanks and soil dams, or a material for soft ground improvement, the solidified material prepared by adding 2-6 parts by weight of a 3-5-fold dilution of a solidifying agent and 3-15 parts by weight of cement to 100 parts by weight of soil, industrial waste or a mixture of two or more thereof, wherein the solidifying agent contains, based on the total weight of the solidifying agent, 16-24 wt % of straight asphalt, 0.06-0.10 wt % of an emulsifier for asphalt, 0.8-1.2 wt % of oil, 0.01-0.03 wt % of calcium chloride, 0.8-1.2 wt % of lignin, 0.7-1.3 wt % of an acrylic emulsion-based asphalt modifier, 0.13-0.21 wt % of sodium hydroxide, 0.22-0.34 wt % of oleic acid, and a balance of water.

\* \* \* \* \*